United States Patent
Moriyama et al.

[11] Patent Number: 5,770,111
[45] Date of Patent: Jun. 23, 1998

[54] PHOSPHOR WITH AFTERGLOW CHARACTERISTIC

[75] Inventors: Hirofumi Moriyama; Tomofumi Moriyama; Teruo Goto, all of Kanagawa, Japan

[73] Assignee: Kabushiki Kaisha Tokyo Kagaku Kenkyusho, Kanagawa, Japan

[21] Appl. No.: 737,906

[22] PCT Filed: Apr. 12, 1996

[86] PCT No.: PCT/JP96/01014

§ 371 Date: Nov. 26, 1996

§ 102(e) Date: Nov. 26, 1996

[87] PCT Pub. No.: WO96/32457

PCT Pub. Date: Oct. 17, 1996

[30] Foreign Application Priority Data

Apr. 14, 1995 [JP] Japan ..................... 7-112574

[51] Int. Cl.⁶ .............. C09K 11/80; C09K 11/64
[52] U.S. Cl. .............. 252/301.4 R; 252/301.4 F
[58] Field of Search ............ 252/301.4 R, 301.4 F

[56] References Cited

U.S. PATENT DOCUMENTS

| | | | |
|---|---|---|---|
| 5,424,006 | 6/1995 | Murayama et al. | 252/301.4 R |
| 5,424,066 | 6/1995 | Murayama et al. | 252/301.4 R |

FOREIGN PATENT DOCUMENTS

| | | |
|---|---|---|
| 6-248264 | 9/1994 | Japan . |
| 7-11250 | 1/1995 | Japan . |
| 8-73845 | 3/1996 | Japan . |

OTHER PUBLICATIONS

B. Smets et al, Two New Blue–Emitting Phosphors, J. Electrochem. Soc., vol. 136, No. 7, pp. 2119–2123, Jul. 1989.

Primary Examiner—Melissa Bonner
Attorney, Agent, or Firm—Frishauf, Holtz, Goodman, Langer & Chick, P.C.

[57] ABSTRACT

A phosphor exhibiting afterglow more intensely and persistently than $(Sr, Eu, Dy)O.Al_2O_3$ phosphors. The phoshor has a chemical composition comprising mainly an $Eu^{2+}$ activated strontium aluminate phosphor substance as a matrix in which a part of the strontium (Sr) is substituted with at least one of Pb, Dy and Zn.

17 Claims, 2 Drawing Sheets

PHOSPHOR WITH AFTERGLOW CHARACTERISTIC

TECHNICAL FIELD

The present invention relates to a phosphor or fluorescent substance having afterglow characteristics and adapted for example for use in luminous paint and the like.

BACKGROUND ART

In the past, there has been the occurrence of a so-called "afterglow phenomenon" as a characteristic of a phosphor or fluorescent substance. For instance, in the case of zinc silicate ($Zn.SiO_4:Mn^{20+}$)-type phospor, the occurrence of such "afterglow phenomenon" will be caused depending on the selection of its composition, firing conditions, etc. Also, "afterglow phenomenon" occurs not only in the case of zinc silicate ($ZnSiO_4:Eu^{2+}$) type but also in the case of strontium aluminate type SAE ($4SrO.7Al_2O_3:Eu^{2+}$), etc.

However, the duration times of their afterglow are merely on the order of several seconds at the most, and also it is recognized that as regards the characteristics of the phospor, generally the possession of afterglow characteristics is not desirable and rather tends to deteriorate the fluorescence characteristics.

Then, in addition to the above-mentioned SAE (490 nm), suchsubstances as $2SrO.3Al_2O_3$ (SAL: 460 nm) are also known as the so-called strontium aluminate phosphor. It has been reported that not only these phosphors are different in the emission peaking but also they are different compounds in terms of the crystal structure (B. Smets, J. Rutten, G. Hocks and J. Verlijsdonk; J. Electrochem. Soc. 136, 2119, 1989).

However, while the investigations have been vigorously conducted on the strontium aluminates having emission wavelengths of "blue" or "blue green" as light emitting phosphors for lamps, such investigations as aimed toward improving the afterglow phenomenon as in the case of the so-called "luminous paints" have been practically unknown.

Recently, phosphors have been proposed which have long afterglow characteristics by virtue of the addition of dysprosium (Dy) or the like (JP-A-7-11250, EP-A-0 622 440, U.S. Pat. No. 5,424,006). Such phosphor is represented in terms of a compound $MAl_2O_4$, and more particularly it is a compound in the form of a mother crystal in which M represents at least one metal element selected from the group consisting of calcium, strontium and barium and which contains europium (Eu) as an activator in an amount of not less than 0.001% and not greater than 10% in terms of mol % relative to the metal element represented by M and also, as a co-activator, at least one element selected from the group consisting of lanthanum, cerium, praseodymium, neodymium, samarium, gadolinium, terbium, dysprosium, holmium, erbium, thulium, ytterbium, lutetium, manganese, tin and bismuth in an amount of not less than 0.001% and not greater than 10% in terms of mol % relative to the metal element represented by M. It is to be noted that the afterglow of this proposed phosphor is the emission of light having a greenish color tone.

DISCLOSURE OF INVENTION

The inventors have made earnest efforts in the production of a phosphor having more intense and longer afterglow characteristics by utilizing one of the previously mentioned compounds $MAl_2O_4$, more particularly a phosphor ($SrO.Al_2O_3:Eu^{2+}Dy^{2+}$) in which strontium and aluminate are added in the same mol with each other as a reference sample.

As a result, the inventors have succeeded in the production of phosphors having more intense and longer afterglow characteristics by utilizing as matrices the phosphor $SrO.yAl_2O_3:Eu^{2+}$ containing strontium and aluminate in varying proportions. In addition, the production of a phosphor having more intense and longer afterglow characteristics has been succeeded by adding a trace amount of a novel additive element to the previously mentioned compound $MAl_2O_4$.

In other words, it is the primary object of the present invention to provide a phosphor having more intense and longer afterglow characteristics, and more particularly, it is another object of the present invention to provide a phosphor in which strontium and aluminate are activated by europium and added in the same mol proportion with each other, thus ensuring more intense and longer afterglow characteristics than those of the conventional phosphor ($SrO.Al_2O_3:Eu^{2+}Dy^{2+}$).

In accordance with the present invention, the above objects are achieved by any of the phosphors with afterglow characteristic which are stated in the claims.

The present invention provides a first phosphor with afterglow characteristic which comprises a matrix composed of an $Eu^{2+}$ activated strontium aluminate-type phosphor and has a chemical composition expressed by:

$$(Sr, Eu, Pb)O.y(Al, Bi)_2O_3$$

where $Sr+Eu+Pb=1$, $Al+Bi=2y$.

A preferred aspect of the first phosphor has a chemical composition shown as follows:

$$(Sr_{0.955} Eu_{0.03} Pb_{0.015}) Al_{2.991} Bi_{0.009} O_{5.5}$$

The present invention also provides a second phosphor with afterglow characteristic which comprises a matrix composed of an $Eu^{2+}$ activated strontium aluminate-type phosphor and has a chemical composition expressed by:

$$(Sr, Eu, Pb, Dy)O.y(Al, Bi)_2O_3$$

(where $Sr+Eu+Pb+Dy=1$, $Al+Bi=2y$)

with the range of y being selected $0.83 \leq y \leq 1.67$ and the proportions (mol) of the respective elements being selected $0.016 \leq Eu \leq 0.033$, $0.006 \leq Pb \leq 0.017$, $0.050 \leq Dy \leq 0.133$, $1.655 \leq Al \leq 3.334$, and $0.0030 \leq Bi \leq 0.0100$.

In accordance with a preferred aspect of the second phosphor, the range of y is $1.00 \leq y \leq 1.15$, and the proportions (mol) of the respective elements are $0.020 \leq Eu \leq 0.023$, $0.010 \leq Pb \leq 0.011$, $0.05 \leq Dy \leq 0.133$, $1.994 \leq Al \leq 2.2964$ and $0.0036 \leq Bi \leq 0.006$.

The present invention also provides a third phosphor with afterglow characteristic which comprises a matrix composed of an $Eu^{2+}$ activated strontium aluminate-type phosphor and has a chemical composition expressed by:

$$(Sr, Eu, Pb, Dy)O.(Al, Bi)_2O_3$$

(where $Sr+Eu+Pb+Dy=1$, $Al+Bi=2$)

with the proportions (mol) of the respective elements being selected $0.016 \leq Eu \leq 0.02$, $0.006 \leq Pb \leq 0.010$, $0.060 \leq Dy \leq 0.133$, $1.994 \leq Al \leq 1.9964$ and $0.0036 \leq Bi \leq 0.006$.

In accordance with a preferred aspect of the third phosphor, the proportions (mol) of the respective elements are selected $0.017 \leq Eu \leq 0.03$, $0.008 \leq Pb \leq 0.017$, $0.08 \leq Dy \leq 0.11$, $1.994 \leq Al \leq 1.9964$ and $0.0036 \leq Bi \leq 0.006$.

The above-mentioned first, second and third phosphors according to the present invention can each have a chemical composition in which a part of strontium (Sr) is substituted with zinc (Zn).

This substitution of zinc (Zn) is such that a good result can be obtained by substituting several mol %, preferably 1.3 to 2.6 mol % of strontium (Sr) with zinc.

The present invention also provides a fourth phosphor with afterglow characteristic which comprises a matrix composed of an $Eu^{2+}$ activated strontium aluminate-type phosphor and has a chemical composition expressed by:

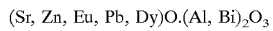
(Sr, Zn, Eu, Pb, Dy)O.(Al, Bi)$_2$O$_3$ where Sr+Zn+Eu+Pb+Dy=1, Al+Bi=2, and the proportions of the respective elements in one molecule are $0.013 \leq Zn \leq 0.027$, $0.017 \leq Eu \leq 0.03$, $0.008 \leq Pb \leq 0.017$, $0.05 \leq Dy \leq 0.133$, $1.994 \leq Al \leq 1.9964$ and $0.0036 \leq Bi \leq 0.006$.

The present invention also provides a fifth phosphor with afterglow characteristic which comprises a matrix composed of an $Eu^{2+}$ activated strontium aluminate-type phosphor and has a chemical composition expressed by:

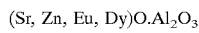
(Sr, Zn, Eu, Dy)O.Al$_2$O$_3$ where Sr+Zn+Eu+Dy=1.

In accordance with a preferred aspect of the fifth phosphor, the proportions (mol) of the respective elements are $0.005 \leq Zn \leq 0.010$, Eu=0.20 and Dy=0.05.

In accordance with the present invention, a phosphor in which the proportions of SrO and Al$_2$O$_3$ are different from 1:1 is used as a matrix. This matrix phosphor is mixed with trace elements of various proportions so as to produce a phosphor which is excellent in afterglow characteristics.

With the phosphor according to this invention comprising as its matrix an SrO.yAl$_2$O$_3$:Eu$^{2+}$-type phosphor in which the proportions of SrO and Al$_2$O$_3$ are different from 1:1, where the proportion of Sr(or SrO) is selected to be 1 mol, if the proportion of Al, for example, is 3 mol (namely, the proportion of Al$_2$O$_3$ is 1.5 mol), it is possible to ensure more intense afterglow characteristics by substituting a part of Sr with Pb and also substituting a part of Al with Bi even if it is set so that Dy=0. Thus, the first phosphor according to the present invention has the chemical composition expressed by:

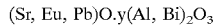
(Sr, Eu, Pb)O.y(Al, Bi)$_2$O$_3$ where Sr+Eu+Pb=1, Al+Bi=2y.

The contents of Pb and Bi in the first phosphor can be very small, and where the proportion of Sr (or SrO) is selected to be 1 mol, if the proportion of Al, for example, is 3 mol (namely, the proportion of Al$_2$O$_3$ is 1.5 mol), it is preferable to select so that the proportion of Pb substituting a part of Sr is 0.015 mol and the proportion of Bi substituting a part of Al is 0.009 mol. Also, in the case of this fluorescent substance, the afterglow characteristics will be deteriorated extremely if any of Pb and Bi lacks. Therefore, an especially preferred chemical composition of the first phosphor is represented by:

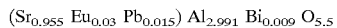
(Sr$_{0.955}$ Eu$_{0.03}$ Pb$_{0.015}$) Al$_{2.991}$ Bi$_{0.009}$ O$_{5.5}$ It is to be noted that even in the preparation process of the phosphor according to the invention, it is desirable to use a trace amount of boric acid (H$_3$BO$_3$) as a flux in the like manner as the conventional procedure. It has been confirmed that the composition of the fired phosphor will be caused to loose its uniformity and the emission characteristic will be deteriorated considerably if no boric acid is used or if it is used in an extremely small amount. Not only boric acid acts as a flux (the promotion of crystal growth) but also a very small part of it remains as boron in the phosphor. While it is presumed that this remaining boron changes the phase of beta-alumina, its reason has not been generally clarified as yet. However, where at least two crystals or phases are present, it is considered that boron has an action of bonding the two together.

Then, while the afterglow produced by the phosphor having the composition represented by (Sr, Eu, Pb)O.y(Al, Bi)$_2$O$_3$ (where Sr+Eu+Pb=1, Al+Bi=2y) is comparatively intense and excellent in color tone, the duration time of the afterglow is not so long as intended by the present invention although it is longer than in the case of the conventional phosphors.

In this connection, the second phosphor according to the present invention contains Dy in addition to Pb and Bi so as to ensure the afterglow of a still longer life (in the case of Pb and Bi alone, the afterglow decays rapidly although its intensity is high).

More specifically, the second phosphor has the composition expressed by (Sr, Eu, Pb, Dy)O.y(Al, Bi)$_2$O$_3$ (where Sr+Eu+Pb+Dy=1, Al+Bi=2y).

As regards the proportions of (Sr+Eu+Pb+Dy) and (Al+Bi) relative to each other in the second phosphor (Sr, Eu, Pb, Dy)O.y(Al, Bi)$_2$O$_3$ (where Sr+Eu+Pb+Dy=1, Al+Bi=2y), it has been confirmed that if, for example, the proportion of (Al+Bi) is 3 mol, the proportion of (Sr+Eu+Pb+Dy) is in the range from 0.9 to 1.8 mol and an especially preferred range is from 1.3 to 1.5 mol. Also, it has been confirmed that this ratio (Sr+Eu+Pb+Dy)/(Al+Bi) is the same in the cases where proportion of (Al+Bi) is 4 mol and 5 mol, respectively.

Thus, in the case of the second phosphor (Sr, Eu, Pb, Dy)O.y(Al, Bi)$_2$O$_3$, it is possible to improve the afterglow characteristics by increasing the proportion of Dy.

AS regards the relation between (Sr+Eu+Pb+Dy) and (Al+Bi), it has been confirmed that if the proportion of (Sr+Eu+Pb+Dy) is excessively high as compared with that of (Al+Bi), the afterglow performance is deteriorated extremely, whereas if the proportion of (Sr+Eu+Pb+Dy) is excessively low as compared with that of (Al+Bi), the afterglow performance is deteriorated and the duration time of the afterglow is also decreased.

It follows from this that it is most preferable to prepare the phosphor in a way that the proportions of (Sr+Eu+Pb+Dy)O and (Al+Bi)$_2$O$_3$ are the same with each other. In other words, it has been confirmed that it is most preferable to blend (Al+Bi) in a way that its proportion becomes two times that of (Sr+Eu +Pb+Dy).

Thus, the third phosphor according to this invention has the chemical composition given by (Sr, Eu, Pb, Dy)O.(Al, Bi)$_2$O$_3$ (where Sr+Eu+Pb+Dy=1, Al+Bi=2).

In this third phosphor (Sr, Eu, Pb, Dy)O.y(Al, Bi)$_2$O$_3$, the proportion of Dy has a certain range for ensuring excellent afterglow characteristics. For instance, where the proportion of Sr (or SrO) in one unit molecule is selected to be 1.5 mol, if the proportion of Al is 3 mol (namely, the proportion of Al$_2$O$_3$ is 1.5 mol), the proportion of 0.09 for Dy is still insufficient although the afterglow characteristics are recognized. Preferably, excellent afterglow characteristics can be obtained by selecting the proportion of Dy to come within the range from 0.12 to 0.15 mol. While the afterglow intensity is still decreased slightly when the proportion of Dy is selected to come within the range of 0.18 to 0.20 mol, contrary the duration time of the afterglow is increased in proportion to an increase in the proportion of Dy.

This third phosphor corresponds to a phosphor produced by substituting a part of Sr with Pb and a part of Al with Bi in the previously mentioned reference phosphor having the composition of (Sr, Eu, Dy)O.Al$_2$O$_3$ (where Sr+Eu+Dy=1).

However, while, in the case of the third phosphor of the present invention, it is certainly most preferable to blend (Al+Bi) in a manner that its proportion becomes two times that of (Sr+Eu+Pb+Dy) as compared with the previously mentioned composition of (Sr, Eu, Dy)O.Al$_2$O$_3$ (where Sr+Eu+Dy=1) which requires an exact control of the proportions, the third phosphor differs greatly from the conventional phosphor in that sufficient afterglow characteristics can be obtained without performing any exact control of the proportions.

This can be considered in this way that the inclusion of Pb in the fluorescent substance results in a crystal structure which is different from the conventional phosphor of (Sr, Eu, Dy)O.Al$_2$O$_3$ or, while the crystal structure is the same, the presence of Pb maintains the crystal structure stable thus making it possible to withstand the further addition of Dy.

Further, in the case of this third phosphor produced by substituting a part of Sr with Pb and substituting a part of Al with Bi in the conventional phosphor of the composition (Sr, Eu, Dy)O.Al$_2$O$_3$ (where Sr+Eu+Dy=1), the characteristics as the phosphor are improved over two times at the maximum.

With the above-mentioned first, second and third phosphors of (Sr, Eu, Pb, Dy)O.y(Al, Bi)$_2$O$_3$ according to the invention, while it is not clear how the substitution of a part of Sr with Zn relates to the afterglow characteristics, it has been found that the addition of Zn remarkably improves the response of the fluorescent characteristics in addition to the improvement of the basic fluorescent characteristics. While it is difficult to give any definite expression in terms of a numerical value and generally the afterglow is hidden by the reflected light thus making its visual observation difficult in a condition where there is even a slight light, the addition of Zn improves the initial intensity thus making it possible to easily perceive the afterglow.

Particularly, the fourth phosphor having afterglow characteristics according to the invention has the composition given by (Sr, Zn, Eu, Pb, Dy)O.(Al, Bi)$_2$O$_3$ (where Sr+Zn+Eu+Pb+Dy=1, Al+Bi 2) and the proportions (mol) of the respective elements are $0.013 \leq Zn \leq 0.027$, $0.017 \leq Eu \leq 0.03$, $0.008 \leq Pb \leq 0.017$, $0.05 \leq Dy \leq 0.133$, $1.994 \leq Al \leq 1.9964$ and $0.0036 \leq Bi \leq 0.006$).

While, in the fourth phosphor, a part of strontium (Sr) is substituted with lead (Pb), dysprosium (Dy) and zinc (Zn), the composition of this fourth phosphor has been examined as regards the afterglow characteristics of the composition without the addition of Pb. As a result, it has been confirmed that the phosphor of the composition in which a part of Sr is substituted with zinc (Zn) shows the lasting afterglow characteristics even if a part of Sr is not substituted with lead (Pb).

Therefore, the fifth phosphor according to the present invention has the composition given by (Sr, Zn, Eu, Dy)O.Al$_2$O$_3$ (where Sr+Zn+Eu+Dy=1, and the proportions (mol) of the respective elements are $0.005 \leq Zn \leq 0.010$, Eu=0.20 and Dy=0.05).

BEST MODE FOR CARRYING OUT THE INVENTION

Preparation of Phosphors

Figure 1:
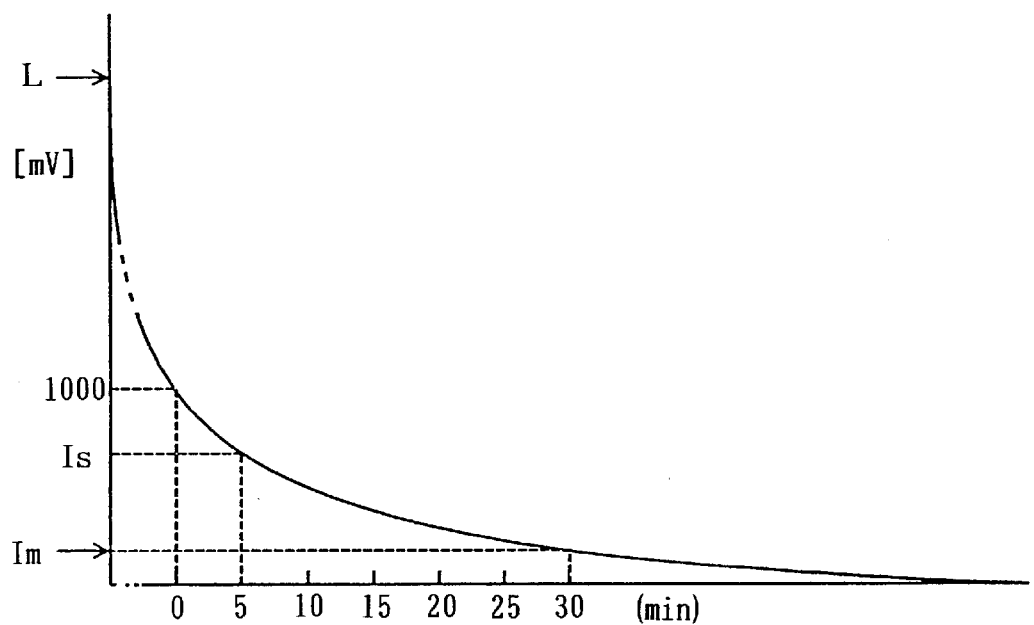
FIG. 1 shows a graph for explaining the afterglow characteristics of a phosphor with the ordinate representing the output voltage (mV) of a luminance meter and the abscissa representing the time (min).

Using the following raw materials A to H, the below-mentioned embodiments and comparative phosphors were prepared.
A) Strontium carbonate SrCO$_3$
B) Europium oxide Eu$_2$O$_3$
C) Dysprosium oxide Dy$_2$O$_3$
D) Aluminum oxide alpha—Al$_2$O$_3$
E) Lead fluoride PbF$_2$
F) Basic bismuth carbonate b-BiCO$_3$
G) Zinc carbonate ZnCO$_3$
H) Boric acid H$_3$BO$_3$ Then, the ranges (mol) of addition per molecule of the respective elements were as follows.
a) Sr $0.90 \leq Sr \leq 3.00$
b) Eu $0.02 \leq Eu \leq 0.05$
c) Dy $0.04 \leq Dy \leq 0.24$
d) Al $2.00 \leq Al \leq 6.00$
e) Pb $0.01 \leq Pb \leq 0.03$
f) Bi $0.009 \leq Bi \leq 0.03$
g) Zn $0.01 \leq Z \leq 0.04$
h) B $0.005 \leq B \leq 0.035$ It is to be noted that as in the case of the ordinary aluminate-type phosphors, chiefly aluminum fluoride was used in substitution for a part of aluminum oxide for use as a flux. Also, boric acid was used singly or along with aluminum fluoride as mentioned previously. In fact, when preparing the phosphors, the raw material mixtures were fired in a weak reducing air stream for several hours thereby producing the phosphors which were extremely excellent in fluorescence and afterglow characteristics.

Preparation of Comparative Phosphor (Sr, Eu, Dy)O.Al$_2$O$_3$ (Sr, Eu, Dy)O.Al$_2$O$_3$ phosphor was prepared as the object of comparison for the phosphor having afterglow characteristics according to the present invention. This comparative phosphor comprises a phosphor containing SrO and Al$_2$O$_3$ with the 1:1 ratio. More specifically, 0.925 mol of Sr, 0.025 mol of Eu, 0.05 mol of Dy and 2.00 mol of Al were mixed and then fired using 0.03 mol of H$_3$BO$_3$ as a flux. This comparative phosphor was represented as SG—Dy—6. This comparative phosphor (SG—Dy—6) belonged to the conventional phosphors represented by the previously mentioned compound MAl$_2$O$_4$ (where M is a compound as a mother crystal comprising at least one metal element selected from a group consisting of calcium, strontium and barium, and there were contained 0.001% to 10% of europium (Eu) in terms of mol % relative to M as an activator and 0.001% to 10% in terms of mol % relative to the metal element represented by M of at least one metal element selected from a group consisting of lanthanum, cerium, praseodymium, neodymium, samarium, gadolinium, terbium, dysprosium, holmium, erbium, thulium, ytterbium, lutetium, manganese, tin and bismuth as a co-activator).

Verification of Afterglow Characteristics

FIG. 1 shows a graph for explaining the afterglow characteristics of the phosphor. Here, the ordinate represents the emission intensity (namely, the output voltage (mV) of a luminance meter) and the abscissa represents the time (min).

The phosphor having the afterglow characteristics means a fluorescent substance adapted to produce the emission of light that lasts even after the interruption of the excitation radiation (a so-called "afterglow"). The initial intensity of the afterglow of the $Eu^{2+}$ activated strontium aluminate-type phosphor is considerably high. However, the afterglow is a kind of radiation and therefore its emission energy decays with the passage of time. Thus, in the verification of the afterglow characteristics of the below-mentioned embodiments the periods of rapid decay of the emission intensity were avoided and the measured values were recorded after the establishment of the comparatively stable conditions.

More specifically, after a holder containing a sample had been kept in a dark place for over 16 hours, the light from a 27-watt fluorescent lamp was irradiated (for 10 minutes) to the sample in the holder at a distance of 300 mm and then instantly placed in a measuring instrument (the luminance meter; manufactured by Matsushita Denshi Kogyo R&D Center Corp., the phototube; R847 manufactured by Hamamatsu Photonix Corp., the recorder; Phoenix PRR5000 manufactured by Toa Dempa Co., Ltd.), thereby measuring the afterglow characteristics. As shown in FIG. 1, the time at which the digital reading of the luminance meter reached at 1,000 mV after several minutes from the start time (L) of measurement was used as the recording starting time and the decaying conditions thereafter were recorded.

It is to be noted that in the case of the respective embodiments, the readings (mV) at the expiration of 5 minutes from the time of the output voltage of the luminance meter dropping to 1,000 mV were taken as the afterglow intensities (Is) of the samples and also the readings (mV) at the expiration of 30 minutes after the start of the recording were taken as the retention amounts (Im) of the afterglow. Therefore, the afterglow characteristics discussed in connection with the present invention are evaluated in accordance with the afterglow intensity (Is) and the retention amount (Im).

The following TABLE 1 shows the measurement results of the afterglow characteristics of the comparative phosphor (SG—Dy—6).

TABLE 1

| | | Elapsed time (min) | | | | | |
|---|---|---|---|---|---|---|---|
| Sample No. | Dy (mol) | 5 | 10 | 15 | 20 | 25 | 30 |
| SG-Dy-6 | 0.05 | 290 | 170 | 115 | 085 | 065 | 050 |

(unit; mV)

As shown in Table 1, the afterglow intensity (the intensity at the expiration of 5 minutes after the start of the afterglow) and the retention amount (the intensity at the expiration of 30 minutes after the start of the afterglow) of the comparative phosphor (SG—Dy—6) were respectively 290 mV and 50 mV. It is to be noted that the commercially available (Sr, Eu, Dy)O.$Al_2O_3$ phosphor (the trade name; G-550, manufactured by Nemoto & Co., Ltd.) showed the afterglow intensity of 220 mV and the retention amount of 42 mV and therefore it was confirmed that the comparative phosphor (SG—Dy—6) was one having the equivalent afterglow characteristics as the commercially available phosphors. Thus, this comparative phosphor (SG—Dy—6) was employed as the reference object of comparison in the case of the following embodiments.

It is to be noted that with the comparative phosphor (SG—Dy—6), the substitution amount of Dy was varied to prepare a plurality of samples and their afterglow characteristics were measured, showing that the afterglow characteristics were gradually improved in accordance with the substitution amounts of Dy. However, it was confirmed that not only the afterglow but also the emission of fluorescence were lost in the case of the samples in which the substitution amounts of Dy were over 0.10 mol.

From this point, it follows that while the afterglow characteristics are improved in accordance with the substitution amount of Dy, there is an upper limit to the substitution amount of Dy and thus it is presumed that the crystal structure of $SrO.Al_2O_3:Eu^{2+}$ itself is disintegrated if the substitution amount of Dy exceeds 0.10 mol.

In addition, this disintegration of the crystal structure inevitably gives rise to a problem that the proportions of SrO and $Al_2O_3$ constituting the matrix must be controlled exactly. For instant, if the relative ratio of SrO and $Al_2O_3$ deviates greatly from 1:1, that is, where the proportion of Sr (or SrO) is 1 mol, if the proportion of Al is 3 mol (namely, the proportion of $Al_2O_3$ is 1.5 mol), no afterglow characteristics are obtained even if a part of Sr is substituted with Dy.

Embodiment 1. (Pb, Bi-substitution Phosphor)

In the case of the phosphor ($SrO.Al_2O_3:Eu^{2+}$) in which the ratio between the proportions of SrO and $Al_2O_3$ is not 1:1, if, for example, the proportion of Al is made over 3 mol, it is no longer possible to obtain a strong afterglow due to the presence of Dy alone. Thus, in accordance with this embodiment the addition of Pb and Bi resulted in an excellent phosphor.

In other words, with the $SrO.1.5Al_2O_3:Eu^{2+}$ phosphor, the afterglow, though weak, was recognized when a part of Sr was substituted with Pb (0.01 mol in terms of the proportion) in its composition. Also, when a part of Al was substituted with Bi (0.01 mol in terms of the proportion) in this composition, no afterglow was recognized. Further, when a part of Sr was substituted with Pb (0.01 mol in terms of the proportion) and also a part of Al was substituted with Bi (0.01 mol in terms of the proportion), the afterglow appeared intense.

In this way, the conditions for the coexistence of Pb and Bi were searched and the following a) to c) were confirmed.

a) In order to obtain excellent afterglow characteristics, the proportions of Pb and Bi were respectively limited to Pb: 0.015 mol and Bi: 0.009 mol in the above-mentioned chemical compositions.

b) The afterglow became weak when the proportion of either Pb or Bi was greater than that in the above a).

c) In the above-mentioned composition, the amount of Al for satisfying the a) had to be between 2.8 mol and 3.2 mol.

Taking the thus obtained conditions into consideration, the proportion of Eu was selected 0.03 mol thereby obtaining a Pb, Bi-substitution phsphor having the composition expressed by:

$$(Sr_{0.955}\ Eu_{0.03}\ Pb_{0.015})\ Al_{2.991}\ Bi_{0.0009}\ O_{5.5}$$

The afterglow characteristics of the phosphor having this composition were as shown by the following tables under the previously mentioned measurement conditions as compared with the ordinary luminous paint ($ZnS:Cu^{2+}$).

| | Initial afterglow | 5 min. later |
|---|---|---|
| ZnS:Cu | 900 mV | 70 mV |
| Pb, Bi-substitution phosphor | 2,500 mV | 50 mV |

As regards the afterglow retention performance of Pb, Bi-substitution phosphor, it cannot be said to be so excellent as will be seen from the examination of the values at the expiration of 5 minutes. Then, in order to obtain excellent afterglow characteristics, a sample was prepared by substituting a part of Sr with Dy as in the case of the comparative phosphor.

In other words, by utilizing the matrix of the composition SrO.1.5Al$_2$O$_3$:Eu$^{2+}$, sample phosphors having the proportions of Dy set to 0.06 mol were prepared as shown in Table 2 and their initial afterglow and afterglow intensities were measured. The results obtained are shown in Table 3.

TABLE 2

| Sample No. | Sr | Eu | Pb | Dy | x | Al | Bi | 2y |
|---|---|---|---|---|---|---|---|---|
| SG-Al-3-1 | 0.895 | 0.030 | 0.015 | 0.060 | 1.0 | 2.991 | 0.009 | 3.0 |
| SG-Al-3-2 | 0.910 | 0.030 | — | 0.060 | 1.0 | 3.000 | — | 3.0 |

(unit: mol)

TABLE 3

| Sample No. | Dy (mol) | Pb, Bi | Initial afterglow | Afterglow intensity |
|---|---|---|---|---|
| SG-Al-3-1 | 0.06 | Present | 3,700 mV | 189 mV |
| SG-Al-3-2 | 0.06 | None | 3,500 mV | 180 mV |

It was confirmed that as shown in Table 3, when the proportion of Al was 3 mol, the phosphor in which Pb and Bi co-existed was excellent in both initial afterglow and afterglow intensity as compared with the phosphor containing Dy singly as an auxiliary agent.

Embodiment 2. (Dy, Pb, Bi-substitution Phosphor)

With the phosphor having the composition of (Sr, Eu, Pb, Dy)O.y(Al, Bi)$_2$O$_3$, the afterglow characteristics were verified in greater detail. As shown in the following Table 4, five kinds of sample phosphors (sample Nos. SG—Al—3-5, SG—Al—3-6, SG—Al—3-7, SG—Al—3-8, SG—Al—3-10) were prepared by fixing the proportions of the respective elements such that Al+Bi=3 mol, Eu=0.03 mol, Pb=0.015 mol and Dy=0.09 mol and by varying the proportion of Sr+Eu+Pb+Dy within the range of 0.9 to 2.0. It is to be noted that 0.03 mol of boric acid (boron) was used as a flux in the preparation of these sample phosphors.

suring method. The results are shown in the following Table 5. Note that FIG. 2 is a graph showing the results of Table 5 with the ordinate representing the afterglow intensity Is (the output voltage (mV) of a luminance meter) and the abscissa representing the proportion (mol) of Sr+Eu+Pb+Dy (=x).

TABLE 5

| Sample No. | Sr + Eu + Pb + Dy (mol) | 5 min | 10 min | 15 min | 20 min | 25 min | 30 min |
|---|---|---|---|---|---|---|---|
| | | | | (mV) | | | |
| SG-Al-3-5 | 1.5 | 270 | 165 | 115 | 075 | 065 | 055 |
| -3-6 | 1.3 | 259 | 145 | 103 | 080 | 065 | 057 |
| -3-7 | 1.0 | 250 | 145 | 100 | 075 | 060 | 050 |
| -3-8 | 0.9 | 180 | 120 | 083 | 060 | 055 | 045 |
| -3-10 | 1.8 | 170 | 110 | 077 | 055 | 045 | 035 |

Figure 2:
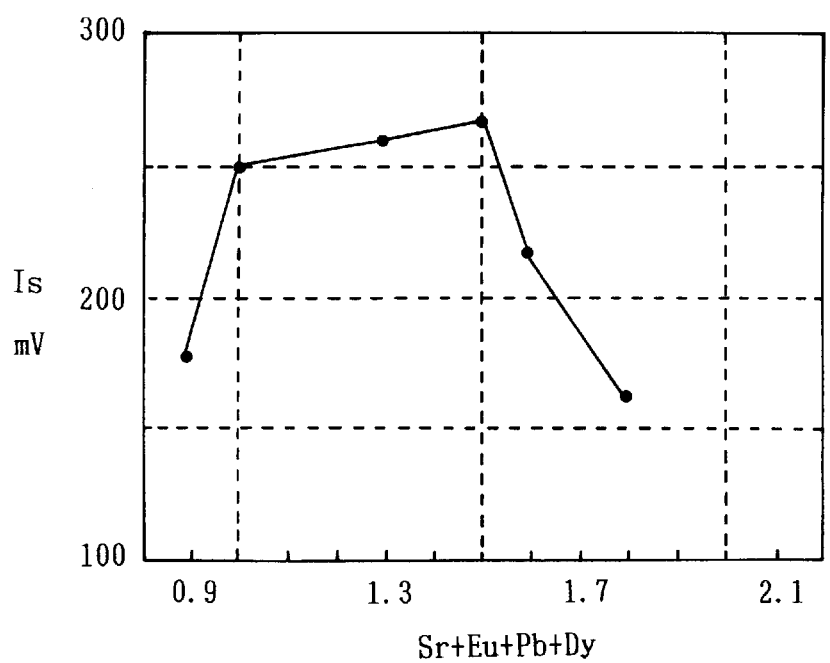
FIG. 2 is a graph showing the measurement results of the afterglow characteristics of sample phosphors (SG—Al—3-5 to SG—Al—3-10) obtained by fixing the proportion of Al+Bi at 3 mol, the proportion of Eu at 0.03 mol, the proportion of Pb at 0.015 mol and the proportion of Dy at 0.09 mol and varying the proportion of Sr+Eu+Pb+Dy within the range of 0.9 to 2.0 in the case of (Sr, Eu, Pb, Dy)O.y(Al, Bi)$_2$O$_3$ phosphor, with the ordinate representing the afterglow intensity Is (the output voltage (mV) of a luminance meter) and the abscissa reprsenting the proportion (mol) of Sr+Eu+Pb+Dy.

As shown in Table 5 and FIG. 2, it was confirmed that as regards the mol ratio of (Sr+Eu+Pb+Dy)/(Al+Bi), when, for example, the proportion of (Al+Bi) was selected 3 mol, the proportion of (Sr+Eu+Pb+Dy) was in the range between 0.9 and 1.8 mol, preferably in the range of 1.3 to 1.5 mol. As a result, when each of the samples was given by (Sr, Eu, Pb, Dy) O.y(Al, Bi)$_2$O$_3$, the value of y was in the range between 0.83 and 1.67 and the preferred value of y was in the range from 1 to 1.15.

Also, the proportions (mol) of Sr, Eu, Pb and Dy were respectively $0.016 \leq Eu \leq 0.033$, $0.006 \leq Pb \leq 0.017$ and $0.05 \leq Dy \leq 0.133$ and it was confirmed that the preferred proportions were respectively $0.020 \leq Eu \leq 0.023$, $0.010 \leq Pb \leq 0.011$ and $0.060 \leq Dy \leq 0.069$.

Embodiment 3. (Dy, Pb, Bi-substitution Phosphor)

With the phosphors having the chemical composition of (Sr, Eu, Pb, Dy)O.y(Al, Bi)$_2$O$_3$, the afterglow characteristics were further verified in detail. As shown in Table 6, six kinds of sample phosphors (SG—Al—3-12 to SG—Al—3-17) were prepared, in addition to the sample No. SG—Al—3-5, by fixing the proportions of the respective elements in such a manner that (Al+Bi)=3 mol and (Sr+Eu+Pb+Dy)=1.5 mol and by changing the proportions of Dy and Sr variously.

TABLE 4

| Sample No. | Sr | Eu | Pb | Dy | x | Al | Bi | 2y |
|---|---|---|---|---|---|---|---|---|
| SG-Al-3-5 | 1.365 (0.910) | 0.03 (0.020) | 0.015 (0.010) | 0.09 (0.06) | 1.5 | 2.991 (1.994) | 0.009 (0.006) | 3.0 |
| SG-Al-3-6 | 1.165 (0.896) | 0.03 (0.023) | 0.015 (0.011) | 0.09 (0.069) | 1.3 | 2.991 (1.994) | 0.009 (0.006) | 3.0 |
| SG-Al-3-7 | 0.865 (0.865) | 0.03 (0.030) | 0.015 (0.015) | 0.09 (0.09) | 1.0 | 2.991 (1.994) | 0.009 (0.006) | 3.0 |
| SG-Al-3-8 | 0.765 (0.850) | 0.03 (0.033) | 0.015 (0.017) | 0.09 (0.10) | 0.9 | 2.991 (1.994) | 0.009 (0.006) | 3.0 |
| SG-Al-3-10 | 1.665 (0.925) | 0.03 (0.017) | 0.015 (0.008) | 0.09 (0.05) | 1.8 | 2.991 (1.994) | 0.009 (0.006) | 3.0 |

*In the Table, the values in the parentheses indicate the mol ratios when (Sr + Eu + Pb + Dy) is 1 mol or (Al + Bi) is 2 mol.

With the resulting samples, the afterglow characteristics were verified according to the previously mentioned mea Note that 0.03 mol of boric acid (boron) was usedas a flux in the preparation of these sample phosphors.

TABLE 6

| Sample No. | Sr | Eu | Pb | Dy | x | Al | Bi | 2y |
|---|---|---|---|---|---|---|---|---|
| SG-Al-3-5 | 1.365 (0.910) | 0.03 (0.02) | 0.015 (0.010) | 0.09 (0.06) | 1.5 | 2.991 (1.994) | 0.009 (0.006) | 3.0 |
| SG-Al-3-12 | 1.335 (0.890) | 0.03 (0.02) | 0.015 (0.010) | 0.12 (0.08) | 1.5 | 2.991 (1.994) | 0.009 (0.006) | 3.0 |
| SG-Al-3-13 | 1.320 (0.880) | 0.03 (0.02) | 0.015 (0.010) | 0.135 (0.09) | 1.5 | 2.991 (1.994) | 0.009 (0.006) | 3.0 |
| SG-Al-3-14 | 1.305 (0.870) | 0.03 (0.02) | 0.015 (0.010) | 0.150 (0.10) | 1.5 | 2.991 (1.994) | 0.009 (0.006) | 3.0 |
| SG-Al-3-15 | 1.290 (0.860) | 0.03 (0.02) | 0.015 (0.010) | 0.165 (0.11) | 1.5 | 2.991 (1.994) | 0.009 (0.006) | 3.0 |
| SG-Al-3-16 | 1.275 (0.850) | 0.03 (0.02) | 0.015 (0.010) | 0.180 (0.12) | 1.5 | 2.991 (1.994) | 0.009 (0.006) | 3.0 |
| SG-Al-3-17 | 1.255 (0.837) | 0.03 (0.02) | 0.015 (0.010) | 0.200 (0.133) | 1.5 | 2.991 (1.994) | 0.009 (0.006) | 3.0 |

*In the Table, the parentheses indicate the values of the mol ratios when it is selected in a manner so that (Sr + Eu + Pb + Dy) = 1 mol or (Al + Bi) = 2 mol.

With the thus obtained samples, the afterglow characteristics were verified in accordance with the previously mentioned measuring method. The results are shown in the following Table 7.

TABLE 7

| Sample No. | Dy mol (mol ratio) | 5 min | 10 min | 15 min (mV) | 20 min | 25 min | 30 min |
|---|---|---|---|---|---|---|---|
| SG-Al-3-5 | 0.09 (0.06) | 270 | 165 | 115 | 075 | 065 | 055 |
| SG-Al-3-12 | 0.12 (0.08) | 420 | 247 | 176 | 137 | 113 | 097 |
| SG-Al-3-13 | 0.135 (0.09) | 420 | 243 | 172 | 133 | 111 | 099 |
| SG-Al-3-14 | 0.150 (0.10) | 420 | 241 | 173 | 129 | 109 | 095 |
| SG-Al-3-15 | 0.165 (0.11) | 416 | 222 | 165 | 136 | 114 | 104 |
| SG-Al-3-16 | 0.180 (0.12) | 360 | 240 | 165 | 135 | 115 | 100 |
| SG-Al-3-17 | 0.200 (0.133) | 360 | 230 | 170 | 138 | 115 | 100 |

The sample phosphors shown in this Table 7 were such that the proportion of (Al+Bi)(=3 mol) was adjusted so as to be two times that of (Sr+Eu+Pb+Dy)(=1.5 mol). This corresponded to that a part of Sr was substituted with Pb and a part of Al was substituted with Bi in the comparative phosphor having the composition of (Sr, Eu, Dy)O.Al$_2$O$_3$ (where Sr+Eu+Dy=1).

Figure 3:
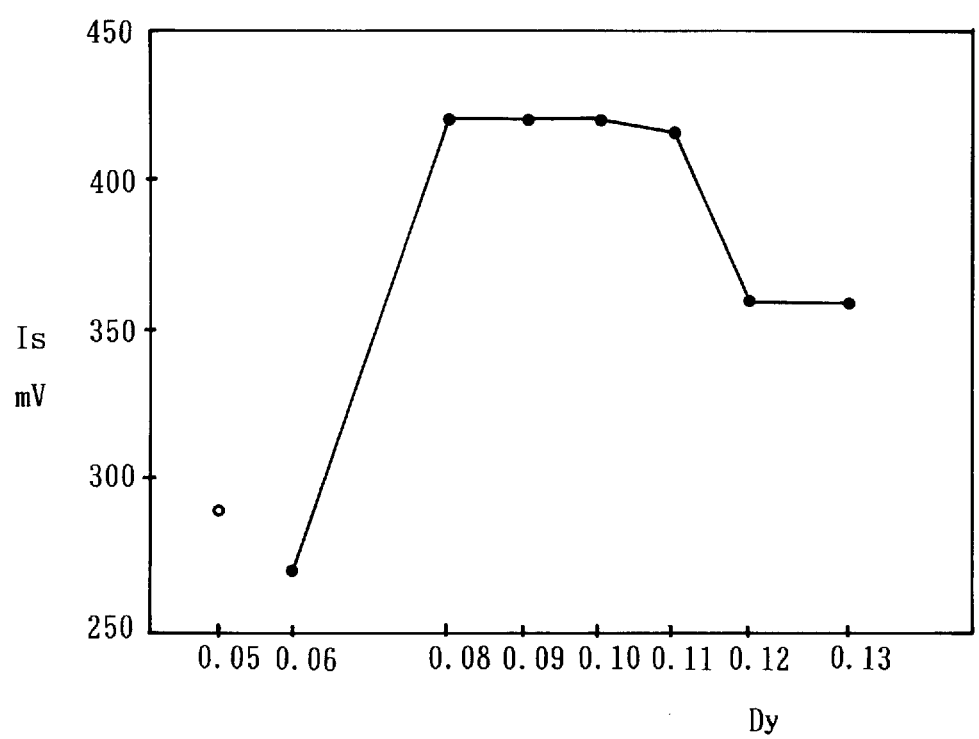
FIG. 3 is a graph showing the variations of the afterglow intensity relative to the proportions of Dy in the case of the sample phosphors (SG—Al—3-5, SG—Al—3-12 to SG—Al—3-17) and the sample phosphpr (SG—Dy—6), with the ordinate representing the afterglow intensity Is (the output voltage (mV) of a luminance meter) and the abscissa representing the proportion (mol) of Dy.

Then, the sample phosphors (SG—Al—3-5, SG—Al—3-12 to SG—Al—3-17) shown in Tables 6 and 7 were compared in afterglow intensity with the comparative sample phosphor (SG—Dy—6) shown in Table 1. FIG. 3 is a graph showing the variations of the afterglow characteristics with the proportion of Dy. In the Figure, the ordinate indicates the afterglow intensity Is (mV) and the abscissa indicates the proportion (mol) of Dy. It is to be noted that the proportions of Dy are shown in terms of mol ratio with the proportions of (Sr+Eu+Pb+Dy) and (Sr+Eu+Dy) being selected 1 mol. In the Figure, the black spots indicate the afterglow characteristics of the sample phosphors (SG—Al—3-5, SG—Al—3-12 to SG—Al—3-17) shown in Tables 6 and 7 and the white spot indicates the afterglow characteristics of the comparative sample phosphor (SG—Dy—6) shown in TABLE 1.

As mentioned previously, while, in the case of the comparative sample phosphor (SG—Dy—6) containing no Pb and Bi, not only the afterglow characteristics but also the fluorescent characteristics are lost when the proportion of Dy exceeds 0.10 mol, in the case of the sample phosphors (SG—Al—3-5, SG—Al—3-12 to SG—Al—3-17) containing Pb and Bi, as shown in FIG. 3, selecting the proportion of (Sr+Eu+Pb+Dy) to be 1 mol has the effect of ensuring an excellent afterglow intensity when the proportion of Dy is selected in the range from 0.08 to 0.11 mol and slightly decreasing the intensity with the greater proportions of Dy, whereas the retention amount (at the expiration of 30 minutes) is increased in proportion to the proportion of Dy (see Table 7).

Further, while, in the case of the comparative phosphor, the range of the composition showing the afterglow characteristics is limited thus tending to make the preparation of the phosphor difficult, the coexistence of Pb and Bi with Dy has the effect of increasing the range of variations in the substitution amount of Dy tending to make possible the maintenance of stronger afterglow characteristics of two times or over. Particularly, where there is the coexistence of Pb, Bi and Dy, the initial intensity of the afterglow has an extremely high value of about 4,500 mV.

Embodiment 4. (Dy, Pb, Bi-substitution Phosphor)

While, in the case of the Embodiment 3, Al+Bi and (Sr+Eu+Pb+Dy) were respectively fixed at 3 mol and 1.5 mol and the proportions of Dy and Sr were changed variously in the phosphor of the composition (Sr, Eu, Pb, Dy)O.y(Al, Bi)$_2$O$_3$, in the case of the Embodiment 4, as shown in Table 8, three different sample phosphors were prepared in which Al+Bi was fixed at 3 mol and the proportions of Sr, Eu, Pb and Dy were varied in such a manner that the proportion of (Sr+Eu+Pb+Dy) became 1.8, 1.3 or 1.6 while maintaining unchanged the ratios of Sr:Eu:Pb:Dy. Note that 0.03 mol of boric acid (boron) was used as a flux in the preparation of these sample phosphors.

TABLE 8

| Sample No. | Sr | Eu | Pb | Dy | x | Al | Bi | 2y |
|---|---|---|---|---|---|---|---|---|
| SG-Al-3-10-2 | 1.605 (0.892) | 0.03 (0.017) | 0.015 (0.008) | 0.15 (0.083) | 1.8 | 2.961 (1.994) | 0.009 (0.006) | 3 |

TABLE 8-continued

| Sample No. | Sr | Eu | Pb | Dy | x | Al | Bi | 2y |
|---|---|---|---|---|---|---|---|---|
| SG-Al-3-6-2 | 1.155 (0.888) | 0.03 (0.023) | 0.015 (0.012) | 0.10 (0.077) | 1.3 | 2.961 (1.994) | 0.009 (0.006) | 3 |
| SG-Al-3-18 | 1.416 (0.885) | 0.03 (0.019) | 0.015 (0.009) | 0.139 (0.087) | 1.6 | 2.961 (1.994) | 0.009 (0.006) | 3 |

*In the Table, the parentheses indicate the values of the mol ratios when (Sr + Eu + Pb + Dy) was selected 1 mol or (Al + Bi) was selected 2 mol.

The afterglow characteristics of the sample phosphors shown in Table 8 were verified according to the previously mentioned measuring method. The results are shown in the following Table 9.

TABLE 9

| Sample No. | Dy (mol) | 5 min | 10 min | 15 min | 20 min | 25 min | 30 min |
|---|---|---|---|---|---|---|---|
|  |  |  |  | (mV) |  |  |  |
| SG-Al-3-10-2 | 0.15 | 210 | 130 | 90 | 80 | 75 | 65 |
| -3-6-2 | 0.10 | 390 | 220 | 130 | 130 | 110 | 90 |
| -3-18 | 0.139 | 326 | 214 | 150 | 120 | 100 | 88 |

While, as shown in TABLES 8 and 9, a comparison with the sample phosphors (SG—Al—3-5, SG—Al—3-6, SG—Al—3-7) of Table 4 and 5 shows that the afterglow characteristics can be improved by increasing the proportion of Dy, both the afterglow intensity and the retention amount are decreased in the sample (SG—Al—3-10-2) in which the ratio between the proportions of (Sr+Eu+Pb+Dy) and (Al+Bi) is far from 1:2.

This may be conceivable to be due to the fact that particulates of good quality cannot be obtained due to not only a problem from the composition point of view but also a problem of the sintering characteristics caused by the ratio of Sr/Al as well as the factors from the manufacturing point of view.

Embodiment 5. (Dy, Pb, Bi-substitution Phosphor)

While, in connection with the Embodiment 3, the verification was made of the (Sr, Eu, Pb, Dy)O.(Al, Bi)$_2$O$_3$ phosphor in which the ratio between the proportions of (Sr+Eu+Pb+Dy) and (Al+Bi) was selected 1:2, in the case of the Embodiment 5 a verification was made as to whether the same afterglow characteristics could be obtained when the proportion of (Sr+Eu+Pb+Dy) was 2 mol or over. Here, as shown in Table 10, sample phosphors were prepared in which the proportion of (Sr+Eu+Pb+Dy) was 2 mol and the proportion of (Al+Bi) was 4 mol. Note that 0.03 mol of boric acid (boron) was used as a flux in the preparation of these sample phosphors.

The afterglow characteristics of the resulting phosphors were verified in accordance with the previously mentioned measuring method. The results are shown in Table 11. As shown in Table 11, while the proportions of Pb and Bi were relatively decreased thus slightly deteriorating the afterglow characteristics, substantially the equivalent satisfactory afterglow characteristics were still obtained.

TABLE 11

| Sample No. | Dy mol | 5 min | 10 min | 15 min | 20 min | 25 min | 30 min |
|---|---|---|---|---|---|---|---|
|  |  |  |  | (mV) |  |  |  |
| SG-Al-4-1 | 0.18 | 380 | 250 | 185 | 150 | 125 | 100 |
| -4-2 | 0.21 | 350 | 230 | 170 | 138 | 115 | 097 |

Embodiment 6. (Dy, Pb, Bi-substitution Phosphor)

As shown in Table 12, two different sample phosphors were prepared in which the proportion of (Sr+Eu+Pb+Dy) was 2 mol or over and also the proportion of (Al+Bi) was 5 mol. The afterglow characteristics of these samples are shown in Table 13. It is to be noted that 0.03 mol of boric acid (boron) was used in the preparation of these sample phosphors.

TABLE 10

| Sample No. | Sr | Eu | Pb | Dy | x | Al | Bi | 2y |
|---|---|---|---|---|---|---|---|---|
| SG-Al-4-1 | 1.765 (0.8825) | 0.04 (0.02) | 0.015 (0.0075) | 0.180 (0.090) | 2 | 3.991 (1.9955) | 0.009 (0.0045) | 4 |
| SG-Al-4-2 | 1.735 (0.8675) | 0.04 (0.02) | 0.015 (0.0075) | 0.210 (0.105) | 2 | 3.991 (1.9955) | 0.009 (0.0045) | 4 |

*In the Table, the parentheses indicate the values of the mol ratios when selecting (Sr + Eu + Pb + Dy) to be 1 mol or (Al + Bi) to be 2 mol.

TABLE 12

| Sample No. | Sr | Eu | Pb | Dy | x | Al | Bi | 2y |
|---|---|---|---|---|---|---|---|---|
| SG-Al-5-1 | 1.765 (0.8825) | 0.04 (0.02) | 0.015 (0.0075) | 0.180 (0.090) | 2.0 | 4.991 (1.9964) | 0.009 (0.0036) | 5 |
| SG-Al-5-2 | 1.725 (0.8625) | 0.04 (0.02) | 0.015 (0.0075) | 0.220 (0.110) | 2.0 | 4.991 (1.9964) | 0.009 (0.0036) | 5 |
| SG-Al-5-3 | 2.220 (0.888) | 0.04 (0.016) | 0.015 (0.006) | 0.225 (0.090) | 2.5 | 4.991 (1.9964) | 0.009 (0.0036) | 5 |

*In the Table, the parentheses indicate the values of the mol ratios when selecting (Sr + Eu + Pb + Dy) to be 1 mol or (Al + Bi) to be 2 mol.

TABLE 13

| Sample No. | Dy mol | 5 min | 10 min | 15 min | 20 min | 25 min | 30 min |
|---|---|---|---|---|---|---|---|
|  |  | (mV) | | | | | |
| SG-Al-5-1 | 0.018 | 360 | 220 | 165 | 130 | 110 | 095 |
| SG-Al-5-2 | 0.022 | 380 | 230 | 165 | 145 | 120 | 099 |
| SG-Al-5-3 | 0.0225 | 350 | 215 | 160 | 135 | 105 | 097 |

Embodiment 7. (Dy, Pb, Zn, Bi-substitution Phosphor)

Two different sample phosphors were prepared by substituting a part of Sr with Zn in (Sr, Eu, Pb, Dy)O.y(Al, Bi)$_2$O$_3$ phosphor and their afterglow characteristics were verified. The compositions of the prepared samples are shown in the following Table 14. And, Table 15 shows the measured afterglow characteristics of the sample phosphors shown in Table 14.

TABLE 14

| Sample No. | Sr | Zn | Eu | Pb | Dy | x | Al | Bi | 2y |
|---|---|---|---|---|---|---|---|---|---|
| SG-Al-3-3 | 1.345 (0.900) | 0.02 (0.013) | 0.03 (0.02) | 0.015 (0.010) | 0.09 (0.06) | 1.5 | 2.991 (1.994) | 0.009 (0.006) | 3 |
| SG-Al-3-4 | 1.325 (0.883) | 0.04 (0.026) | 0.03 (0.02) | 0.015 (0.010) | 0.09 (0.06) | 1.5 | 2.991 (1.994) | 0.009 (0.006) | 3 |

*In the Table, the parentheses indicate the values of the mol ratios when selecting (Sr + Eu + Pb + Dy) to be 1 mol or (Al + Bi) to be 2 mol.

TABLE 15

| Sample No. | Dy mol | 5 min | 10 min | 15 min | 20 min | 25 min | 30 min | Mol |
|---|---|---|---|---|---|---|---|---|
|  |  | (mV) | | | | | | |
| SG-Al-3-3 | 0.09 | 280 | 170 | 125 | 84 | 75 | 65 | Zn 0.02 |
| -3-4 | 0.09 | 255 | 145 | 120 | 77 | 65 | 55 | Zn 0.04 |

As a result of a comparison between the measurement results of the sample phosphor (SG—Al—3-3) of Table 15 and the sample phosphor (SG—Al—3-5) of Table 5, it was confirmed that the response characteristics were improved remarkably in addition to the improvement of the fluorescent characteristics by substituting a part of Sr with a metal element such as Zn. In other words, although it is difficult to express definitely in terms of numerical values and usually the afterglow is hidden by the reflected light in a condition involving even a slight light thus making its visual inspection difficult, the addition of Zn improves the initial intensity thus making it possible to easily recognize the afterglow. It is to be noted that even in this case, it is preferable to select so that Sr+Zn+Eu+Pb+Dy=1 mol. The concentration of Zn can be on the order of several mol % of the proportion of Sr.

Also in this case, it is necessary that the proportion of the activator Eu is on the order of 2 mol % of Sr and the proportion of Dy is two times or more of the amount of Eu.

Embodiment 8. (Zn-substutution Phosphor)

With the embodiment 7, the improvement in the response of the afterglow characteristics was confirmed on the sample phosphors employing as the matrix the phosphor containing Pb, Bi and Dy and substituting a part of its Sr with Zn. Then, two different sample phosphors (SAD 7-2, SAD 7-3) containing no Pb and Bi and substituting a part of Sr with Zn and a comparative sample (SAD 7-1) containing no zinc were further prepared and their afterglow characteristics were verified. The compositions of the prepared samples are shown in the following Table 16. Table 16 shows the proportions (mol) of the respective elements per molecular weight. Note that symbol B indicates the mol of boric acid added as a flux.

TABLE 16

| Sample No. | Sr | Zn | Eu | Dy | x | Al | B |
|---|---|---|---|---|---|---|---|
| SAD 7-1 | 0.930 | — | 0.020 | 0.050 | 1.0 | 2.000 | 0.033 |
| SAD 7-2 | 0.925 | 0.005 | 0.020 | 0.050 | 1.0 | 2.000 | 0.033 |
| SAD 7-3 | 0.920 | 0.010 | 0.020 | 0.050 | 1.0 | 2.000 | 0.033 |
| SG-Dy-6 | 0.925 | — | 0.025 | 0.050 | 1.0 | 2.000 | 0.03 |
| ZnS:Cu G-550 (TM) | | | | | | | |

The measurment of the afterglow characteristics was effected in the following way. The powder of each of the sample phosphors shown in Table 16 was put to fill a holder (the powder filling cavity was 33 mm in inner diameter and 5 mm in depth) and kept in storage in the dark place for more than 16 hours. Then, the light from a 27-watte fluorescent lamp was irradiated on the holder for 10 minutes at the distance of about 150 mm and variations in the intensity of the afterglow immediately thereafter were measured with a measuring instrument (a luminance meter: Type-5712 made by Matsshita Denshi Kogyo R & D Center Corp., a phototube: R847 made by Hamamats Photonix Corp., a recorder: PRR 5000 by Toa Denpa Co., Ltd.).

In addition, the afterglow characteristics were measured under the same conditions on the comparative phosphor (SG—Dy—6), the conventional luminous paint (ZnS:Cu) and the commercially available (Sr, Eu, Dy)O.Al$_2$O$_3$ phosphor (trade name; G-550, manufactured by Nemoto & Co., Ltd.). The results are shown in the following Table 17.

TABLE 17

| Sample No. | 1,000 mV-time (sec) | 5 min | 10 min | 15 min | 20 min | 25 min | 30 min |
|---|---|---|---|---|---|---|---|
| | | | | (mV) | | | |
| SAD 7-1 | 126 | 320 | 185 | 128 | 95 | 75 | 61 |
| SAD 7-2 | 129 | 348 | 198 | 136 | 101 | 81 | 68 |
| SAD 7-3 | 138 | 351 | 205 | 139 | 106 | 83 | 69 |
| SG-Dy-6 | 129 | 279 | 158 | 108 | 80 | 62 | 51 |
| ZnS:Cu | 6 | 15 | 6 | 3 | 2 | 1 | 1> |
| G-550 (TM) | 84 | 235 | 126 | 82 | 59 | 45 | 36 |

*In the Table, 1,000 mV-time indicates the time (seconds) required for the indication value of the luminance meter to reach 1,000 mV after the irradiation of the fluorescent lamp.

As shown in Table 17, even with the sample phosphors containing no lead, the addition of zinc (Zn) resulted in the phosphors having higher afterglow characteristics than the comparative samples (SG—Dy—6, SAD 7-1) containing no lead and zinc.

Also, it was confirmed that the phosphors in which a part of its Sr was substituted with Zn were high in afterglow characteristics as compared with the conventional luminous paint (ZnS:Cu) and the commercially available phosphor (Sr, Eu, Dy)O.Al$_2$O$_3$.

We claim:

1. A phosphor having afterglow characteristics, which comprises a matrix containing an Eu$^{2+}$ activated strontium aluminate phosphor substance, wherein said phosphor has a chemical composition expressed by:

(Sr, Eu, Pb)O.y(Al, Bi)$_2$O$_3$, where Sr+Eu+Pb=1, Al+Bi=2y, said phosphor having a chemical composition of (Sr$_{0.955}$, Eu$_{0.03}$, Pb$_{0.015}$)Al$_{2.991}$Bi$_{0.009}$O$_{5.5}$.

2. A phosphor having afterglow characteristics, which comprises a matrix containing an Eu$^{2+}$ activated strontium aluminate phosphor substance, wherein said phosphor has a chemical composition expressed by:

(Sr, Eu, Pb, Dy)O.y(Al, Bi)$_2$O$_3$, where Sr+Eu+Pb+Dy=1, Al+Bi=2y, wherein in said composition, the value of y is $0.83 \leq y \leq 2.5$, and the proportions in moles of Eu, Pb, Dy, Al and Bi are $0.016 \leq Eu \leq 0.033$, $0.006 \leq Pb \leq 0.017$, $0.05 \leq Dy \leq 0.133$, $1.655 \leq Al \leq 3.334$ and $0.0030 \leq Bi \leq 0.0100$.

3. The phosphor according to claim 2, wherein a part of said strontium (Sr) is substituted with zinc.

4. The phosphor according to claim 2, wherein $1.00 \leq y \leq 1.15$, and the proportions in moles of Eu, Pb, Dy, Al and Bi are $0.020 \leq Eu \leq 0.023$, $0.010 \leq Pb \leq 0.011$, $0.05 \leq Dy \leq 0.133$, $1.994 \leq Al \leq 2.2964$, and $0.0036 \leq Bi \leq 0.006$.

5. The phosphor according to claim 4, wherein a part of said strontium (Sr) is substituted with zinc.

6. The phosphor according to claim 2, wherein said phosphor contains 0.895 moles Sr, 0.030 moles Eu, 0.015 moles Pb, 0.060 moles Dy, 2.991 moles Al, 0.009 moles Bi and 2y is 3.0.

7. The phosphor according to claim 2, wherein said phosphor contains 1.994 moles Al, 0.006 moles Bi and 2y is 3.0 and wherein Sr, Eu, Pb and Dy are in amounts selected from the group consisting of (a) 0.910 moles Sr, 0.020 moles Eu, 0.010 moles Pb and 0.06 moles Dy, (b) 0.896 moles Sr, 0.023 moles Eu, 0.011 moles Pb and 0.069 moles Dy, (c) 0.865 moles Sr, 0.030 moles Eu, 0.015 moles Pb and 0.09 moles Dy, (d) 0.850 moles Sr, 0.033 moles Eu, 0.017 moles Pb and 0.10 moles Dy, and (e) 0.925 moles Sr, 0.017 moles Eu, 0.008 moles Pb and 0.05 moles Dy.

8. The phosphor according to claim 2, wherein said phosphor contains 0.02 moles Eu, 0.010 moles Pb, 1.994 moles Al, 0.006 moles Bi and 2y is 3.0 and wherein Sr, and Dy are in amounts selected from the group consisting of (a) 0.890 moles Sr, and 0.08 moles Dy, (b) 0.880 moles Sr, and 0.09 moles Dy, (c) 0.870 moles Sr, and 0.10 moles Dy, (d) 0.860 moles Sr, and 0.11 moles Dy, (e) 0.850 moles Sr, and 0.12 moles Dy, and (f) 0.837 moles Sr and 0.133 moles Dy.

9. The phosphor according to claim 2, wherein said phosphor contains 1.994 moles Al, 0.006 moles Bi and 2y is 3 and wherein Sr, Eu, Pb and Dy are in amounts selected from the group consisting of (a) 0.892 moles Sr, 0.017 moles Eu, 0.008 moles Pb and 0.083 moles Dy, (b) 0.888 moles Sr, 0.023 moles Eu, 0.012 moles Pb and 0.077 moles Dy, and (c) 0.885 moles Sr, 0.019 moles Eu, 0.009 moles Pb and 0.087 moles Dy.

10. The phosphor according to claim 2, wherein said phosphor contains 0.02 moles Eu, 0.0075 moles Pb, 1.9955 moles Al, 0.0045 moles Bi and 2y is 4 and wherein Sr and Dy are in amounts selected from the group consisting of (a) 0.8825 moles Sr and 0.090 moles Dy, and (b) 0.8675 moles Sr and 0.105 moles Dy.

11. The phosphor according to claim 2, wherein said phosphor contains 1.9964 moles Al and 0.0036 moles Bi and 2y is 5 and wherein Sr, Eu, Pb and Dy are in amounts selected from the group consisting of (a) 0.8825 moles Sr, 0.02 moles Eu, 0.0075 moles Pb and 0.090 moles Dy, (b) 0.8625 moles Sr, 0.02 moles Eu, 0.0075 moles Pb and 0.110 moles Dy, and (c) 0.888 moles Sr, 0.016 moles Eu, 0.006 moles Pb and 0.090 moles Dy.

12. A phosphor having afterglow characteristics, which comprises a matrix containing an Eu$^{2+}$ activated strontium aluminate phosphor substance, wherein said phosphor has a chemical composition expressed by:

(Sr, Eu, Pb, Dy)O.(Al, Bi)$_2$O$_3$, where Sr+Eu+Pb+Dy=1, Al+Bi=2, wherein the proportions in moles of Eu, Pb, Dy, Al and Bi are $0.016 \leq Eu \leq 0.02$, $0.006 \leq Pb \leq 0.010$, $0.06 \leq Dy \leq 0.133$, $1.994 \leq Al \leq 1.9964$ and $0.0036 \leq Bi \leq 0.006$.

13. The phosphor according to claim 12, wherein a part of said strontium (Sr) is substituted with zinc.

14. The phosphor according to claim 12, wherein the proportions in moles of Eu, Pb, Dy, Al and Bi are $0.016 \leq Eu \leq 0.02$, $0.006 \leq Pb \leq 0.010$, $0.08 \leq Dy \leq 0.11$, $1.994 \leq Al \leq 1.9964$ and $0.0036 \leq Bi \leq 0.006$.

15. A phosphor having afterglow characteristics, which comprises a matrix containing an Eu$^{2+}$ activated strontium aluminate phosphor substance, wherein said phosphor has a chemical composition expressed by:

(Sr, Zn, Eu, Pb, Dy)O.(Al, Bi)$_2$O$_3$, where Sr+Zn+Eu+Pb+Dy=1, Al+Bi=2, wherein the proportions in moles of Zn, Eu, Pb, Dy, Al and Bi are $0.013 \leq Zn \leq 0.027$, $0.017 \leq Eu \leq 0.03$, $0.008 \leq Pb \leq 0.017$, $0.05 \leq Dy \leq 0.133$, $1.994 \leq Al \leq 1.9964$ and $0.0036 \leq Bi \leq 0.006$.

16. The phosphor according to claim 15, wherein said phosphor contains 0.02 moles Eu, 0.010 moles Pb, 0.06 moles Dy 1.994 moles Al and 0.006 Bi and wherein Sr and Zn are selected from the group consisting of
  (a) 0.900 moles Sr and 0.013 moles Zn and
  (b) 0.883 moles Sr and 0.026 moles Zn.

17. A phosphor having afterglow characteristics, which comprises a matrix containing an $Eu^{2+}$ activated strontium aluminate phosphor substance, wherein said phosphor has a chemical composition expressed by:

$$(Sr, Zn, Eu, Dy)O \cdot Al_2O_3,$$

where Sr+Zn+Eu+Dy=1, wherein the proportions in moles Sr, Zn, Eu, Dy are $0.920 \leq Sr \leq 0.925$, $0.005 \leq Zn \leq 0.010$, Eu=0.20 and Dy=0.05.

* * * * *